US009413717B2

(12) United States Patent
Wiseman (10) Patent No.: US 9,413,717 B2
(45) Date of Patent: Aug. 9, 2016

(54) APPARATUS AND METHOD FOR CONNECTING COMPUTER NETWORKS

(71) Applicant: DEEP-SECURE LIMITED, Malvern (GB)

(72) Inventor: Simon Robert Wiseman, Malvern (GB)

(73) Assignee: DEEP-SECURE LIMITED, Malvern (GB)

( * ) Notice: Subject to any disclaimer, the term of this patent is extended or adjusted under 35 U.S.C. 154(b) by 0 days.

(21) Appl. No.: 14/409,639

(22) PCT Filed: Jun. 19, 2013

(86) PCT No.: PCT/GB2013/051590
§ 371 (c)(1),
(2) Date: Dec. 19, 2014

(87) PCT Pub. No.: WO2013/190289
PCT Pub. Date: Dec. 27, 2013

(65) Prior Publication Data
US 2015/0150112 A1    May 28, 2015

(30) Foreign Application Priority Data

Jun. 20, 2012  (GB) .................................. 1210907.0
Jun. 20, 2012  (GB) .................................. 1210922.9

(51) Int. Cl.
  *H04L 29/06*  (2006.01)
(52) U.S. Cl.
  CPC ........ *H04L 63/0209* (2013.01); *H04L 63/0245* (2013.01); *H04L 63/1441* (2013.01); *H04L 63/166* (2013.01); *H04L 63/18* (2013.01)

(58) Field of Classification Search
CPC . H04L 63/0209; H04L 63/0245; H04L 63/18; H04L 63/166; H04L 63/1441
See application file for complete search history.

(56) References Cited

U.S. PATENT DOCUMENTS

| | | | | |
|---|---|---|---|---|
| 4,841,523 A | * | 6/1989 | Roffinella | H04L 12/64 370/460 |
| 7,675,867 B1 | | 3/2010 | Mraz et al. | |
| 7,992,209 B1 | * | 8/2011 | Menoher | H04L 63/105 726/16 |
| 2010/0299742 A1 | | 11/2010 | Declety et al. | |

* cited by examiner

*Primary Examiner* — Ali Abyaneh
*Assistant Examiner* — Vance Little
(74) *Attorney, Agent, or Firm* — Leydig, Voit & Mayer, LTD (57) ABSTRACT

Apparatus (104) for connecting two or more computer networks having two or more network interface machines (201, 202, 203) each arranged to be connected to a respective computer network with a bidirectional communications link (105, 106, 107) enabling the network interface machine to receive data from and transmit data to the computer network. The network interface machines are connected together with at least one content checker (210, 211) to enable data to be transmitted from one network interface machine to another, and arranged such that data transmitted from one network interface machine to another network interface machine must pass via a content checker. Each network interface machine is arranged to transmit flow control data. The network interface machines are connected to the content checkers only by unidirectional communications links. This provides an interconnection between networks with different security classifications with the advantages of bidirectional communication links but avoiding the risks of such links.

16 Claims, 5 Drawing Sheets

APPARATUS AND METHOD FOR CONNECTING COMPUTER NETWORKS

TECHNICAL FIELD OF THE INVENTION

The present invention relates to an apparatus and method for connecting computer networks, and in particular for providing a secure connection between computer networks.

BACKGROUND TO THE INVENTION

It is often necessary to control the flow of data into or out of a computer network in order to protect the network and data stored on the network. For example, where two connected networks store data with different security classifications it is desired to prevent data stored on the network with a higher security classification from being transferred to the network with a lower security classification. Whilst data from the network with the lower security classification may in principle be transferred to the network with the higher security classification, it may be desirable to ensure that data is not transferred which could affect the integrity of data stored on the network with the higher classification or otherwise harm that network.

One way to protect computer networks is the use of so called data diodes, as disclosed in U.S. Pat. No. 5,703,562. A data diode provides a unidirectional data connection, so that data can be restricted to flow only in to or out of a network. Whilst this is useful in protecting confidentiality or integrity of information stored by the network, preventing two way communication with the network causes problems.

One problem is that of controlling the flow of data through the data diode. The receiving part of the diode cannot inform the transmitting part of the optimal rate at which to send data, and it is not possible to automatically recover from transmission errors or failures of the receiving logic because the receiving logic cannot inform the sending logic of any problems.

Another problem is that a data diode necessarily has equipment either side of the unidirectional link it provides which requires management, in that it must be configured and will need to report activity for security monitoring purposes. However if the equipment each side of the link is connected to a management system, this provides a bypass of the unidirectional link that could introduce bidirectional communication between the two networks. The only way the unidirectional property can be retained is to use separate management systems for each side of the diode, which is expensive to provide and error prone in operation.

A related problem is that the management system itself is typically a sensitive system that requires protection from the data networks and communications equipment it is managing. The data diode being managed offers no protection for the management system, so further equipment is needed to do this. This additional equipment may include a data diode, in which case it too must be managed without introducing a bypass of the data diode. To avoid this recursion, it is usual for such equipment to be managed from several points with a resultant increase in the scale of management overheads.

In order to address problems caused by imposing unidirectional flow of data between networks, but retain network security, it has been proposed to connect two networks with two separate unidirectional data connections arranged to transmit data in opposite directions between the networks. Each connection comprises a content checker, arranged in series between a pair of data diodes which respectively limit the transmission of data into and out of the content checker. The function of the content checkers is to allow only acceptable data to be transmitted from one network to the other, and the security of the connection relies principally on the content checkers. The data diodes provide protection to the content checkers.

Whilst this arrangement allows for controlled bidirectional communication between networks it is still far from ideal. Although applications running on each network can communicate with each other, to do so they must coordinate to provide the required flow control and error recovery. For example a first application running on a computer on a first network may need to send data to a second application running on a computer on a second, connected, network. The first application can send data via a unidirectional link, but must then listen for an acknowledgement message sent from the second application via the second, opposed, unidirectional link before sending a further message. This approach is in contrast to standard computer network communications protocols which are arranged in a stack with flow control and error recovery typically implemented at multiple levels of the stack. As a result, applications need not concern themselves with flow control and error recovery as this is handled by the network stack. Requiring applications to implement custom protocols for flow control and error recovery, at the application level, is burdensome and limits the usefulness of the approach.

Nor does this approach enable equipment either side of the data diodes to be managed by a single system without bypassing the data diodes and/or the content checkers.

Embodiments of the present invention have been made in consideration of these problems.

SUMMARY OF THE INVENTION

According to an aspect of the present invention there is provided apparatus for connecting two or more computer networks, the apparatus comprising two or more network interface machines each arranged to be connected to a respective computer network with a bidirectional communications link enabling the network interface machine to receive data from and transmit data to the computer network, the network interface machines being connected together with at least one content checker, to enable data to be transmitted from one network interface machine to another, and arranged such that data transmitted from one network interface machine to another network interface machine must pass via a content checker, each network interface machine being arranged to transmit flow control data to another network interface machine thereby to regulate transmission of data between the two network interface machines.

Thus, control of the flow of data between the network interface machines can be managed by the network interface machines through the transmission of flow control data, which is also checked by the or each content checker, without using resources from connected networks or applications between which data is being transferred.

The or each content checker may only pass data only if the data will not damage the integrity of or availability of services offered by its recipient. Alternatively or additionally the or each content checker may not pass information which will cause a damaging revelation.

Another aspect of the invention provides a method of providing bidirectional communication between two or more computer networks using the apparatus, the method comprising the steps of:

connecting each network to a respective network interface machine with a bidirectional communications link;

receiving data from one network at a first network interface machine;

passing the received data to a second network interface machine via at least one content checker;

delivering data received by the second network interface machine to another network to which it is connected via a bidirectional communications link; and passing flow control data between at least the first and second network interface machines via at least one content checker to regulate the transmission of data between the machines.

The network interface machines may be arranged to communicate with the respective computer networks using a bidirectional protocol stack.

Each network interface machine may be connected to a content checker by way of a unidirectional communications link enabling data to be transmitted from the network interface machine to the content checker, but not received by the network interface machine from the content checker. The unidirectional communications link may be formed by a transmitter comprised in each network interface machine, connected via a conduit to a receiver comprised in a content checker.

Each network interface machine may be connected to a different content checker by way of a unidirectional communications link enabling data to be transmitted from the content checker to the network interface machine, but not received by the content checker from the network interface machine Two or more network interface machines may be connected to the same content checker by respective unidirectional links which enable data to be transmitted from the network interface machines to the content checker. A content checker may be connected to two or more network interface machines by respective unidirectional communications links which enable data to be transmitted from the content checker to a selected one, or both of, the connected network interface machines.

Three or more network interface machines and the same number of content checkers may be provided, the content checkers being connected to each other by way of unidirectional communications links in a ring formation, and each network interface machine being connected to one content checker with a unidirectional communications link enabling it to transmit data to the content checker, and to another content checker with a unidirectional communications link enabling it to receive data from the content checker. With this arrangement each content checker may be connected by respective oppositely configured unidirectional communications links to only two network interface machines.

Two or more differently configured content checkers may be connected in series by unidirectional communications links such that data received by the first content checker in the series must pass via each other content checker before onward transmission to another component.

The apparatus may comprise at least three network interface machines, one of which is designated as a management network interface machine and is configured to pass control and management information between a network to which it is connected via a bidirectional communications link, and each of the other network interface machines of the apparatus. Thus all network interface machines can communicate with a single management machine or network without compromising security.

The apparatus may be arranged such that at least one network interface machine can transmit data to any other network interface machine without that data passing through a third network interface machine.

DETAILED DESCRIPTION OF THE INVENTION

In order that the invention may be more clearly understood embodiments thereof will now be described, by way of example only, with reference to the accompanying drawings, of which.

Figure 1:
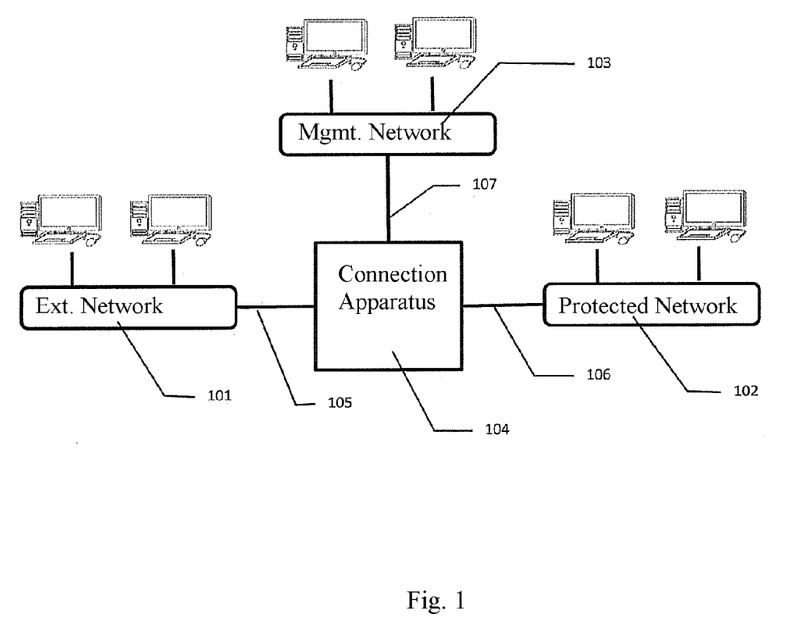
FIG. 1 is an overview of apparatus according to the invention.

Referring to the drawings, FIG. 1 shows three computer networks, an external network 101, a protected network 102 and a management network 103, connected together by way of connection apparatus 104 according to the invention. Each network, 101, 102 and 103, is connected to the connection apparatus 104 by way of a respective, conventional bidirectional communications link 105, 106, 107 supporting a conventional computer network communication protocol employing a bidirectional protocol stack, such as TCP/IP over Ethernet or Frame Relay. Each bidirectional link allows data to be transferred in either direction between the networks it connects and the connection apparatus 104. It may comprise any suitable connection formed by one or more suitable conduits such as electrical cables or optic fibres, and could employ two conduits which serve to pass data in only one direction arranged to pass data in respective opposite directions to establish a bidirectional link.

The connection apparatus allows only specified types of data to be transferred between the networks in order to protect integrity and/or confidentiality of data stored on the networks, or otherwise protect the networks. References to data being stored on a particular network encompass data stored on one or more computer or other apparatus comprised in the network.

Figure 2:
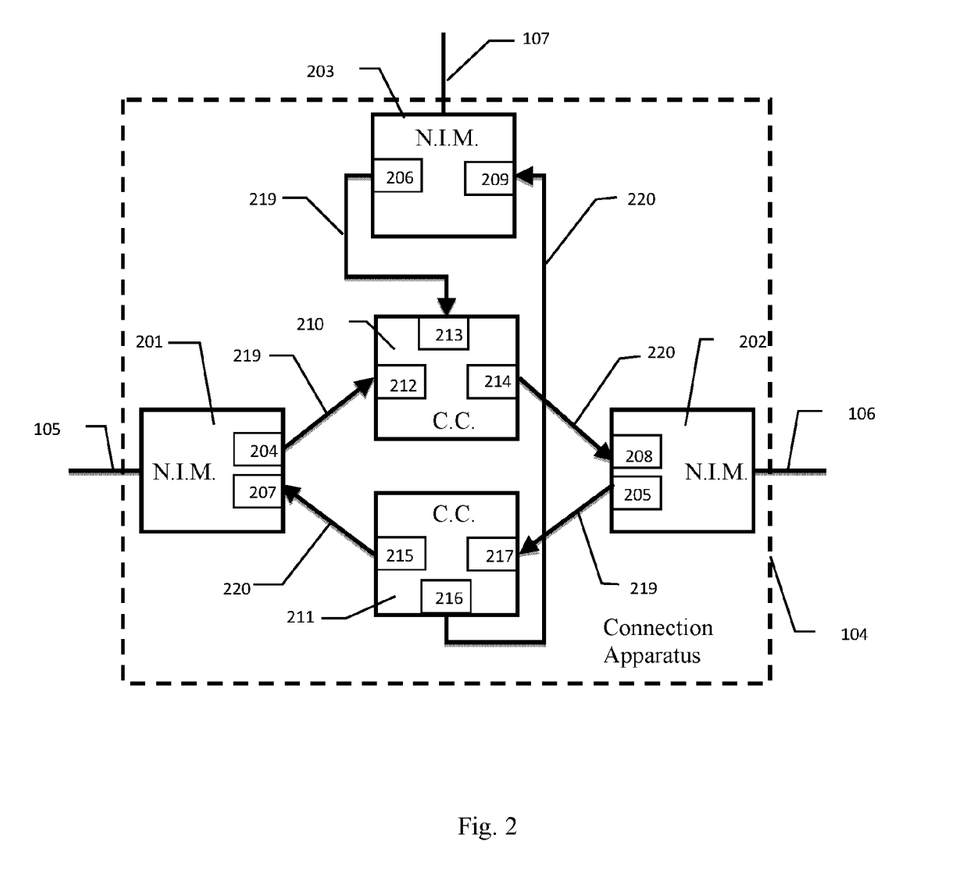
FIG. 2 shows a first embodiment of connection apparatus.

FIG. 2 shows one embodiment of connection apparatus 104 suitable for use in the arrangement illustrated in FIG. 1. Referring to FIG. 2, the apparatus comprises first, second and third network interface machines 201, 202, 203 (each referred to in the Figures as "N.I.M.") for connection respectively to external 101, protected 102 and management networks via bidirectional links 105, 106 and 107 enabling data to be transferred from each network to its associated network interface machine and vice versa.

Each network interface machine comprises a programmed computer comprising appropriate software and/or hardware to implement the bidirectional protocol stack for communicating with a computer network via a bidirectional communications link. Each network interface machine could comprise one or more interconnected components. In particular, each network interface machine could be built from standard general purpose computer equipment such as an Intel™ or Arm™ processor, and run a commodity operating system such as Microsoft™ Windows™ or Linux™. For establishing bidirectional communication with a computer network, the interface machines may comprise commodity computer networking devices such as Ethernet Network Interface Cards.

Application software running on these machines acts as a protocol proxy, terminating connections from client computers attached to a network to which the machines are connected, or making connections to server computers on the network. For email protocols applications such as the sendmail message transfer software could be used as the proxy. For web applications a web server such as Apache™ could be used.

Each interface machine also comprises a transmitter 204, 205, 206 for transmitting data, and a receiver 207, 208, 209 for receiving data. Any suitable transmitters and receiver may be used, but would typically be electrical or optical. Each network interface machine is arranged to transmit data received via the bidirectional communications link, and intended for onward transmission to another device, via its transmitter so as to form a unidirectional data link to the other device, along with flow control data relating to the transmission of data between the network interface machines. This flow control data could comprise, for example, an acknowledgement that data has been received from another network interface machine, or an indication that the machine is ready to receive more data. Each network interface machine is also arranged to transmit data received by its receiver from another device (thus forming a unidirectional data link to that device), and intended for onward transmission, via the bidirectional communications link and to transmit flow control data comprised in or relating to the received data via its transmitter, such as for example an acknowledgement of receipt of data, or signal to request the transmission of further data.

Separate instances of the proxies run on each network interface machine and these communicate through additional software that exchanges data across the unidirectional links. The protocols used by this software could be based on standards such as Ethernet which naturally operate in a unidirectional fashion. The software could be written in any systems programming language such as C++.

The connection apparatus further comprises first and second content checker machines 210, 211. Each content checker machine (each referred to in the Figures as "C.C.") may comprise a programmed computer. The content checkers may be constructed from general purpose computer hardware and commodity operating system, though this is likely to be installed in a minimal configuration to avoid introducing security vulnerabilities in unused software. The protocol handling and content checking software can be written in C++.

Alternatively the content checker may be implemented using special purpose hardware such as that developed for implementing encryption units. These are typically a combination of dedicated external interfaces, processors and programmable logic components such as a suitably programmed Field Programmable Gate Array (FGPA). The function of the content checking is then split up with its interfacing functionality implemented by logic surrounding the interfaces, its protocol handling functionality implemented in software running on the processors and its data validation function implemented in further processors or in logic within an FPGA component.

The first content checker 210 machine comprises two receivers 212, 213 and a single transmitter 214. The second content checker machine 211 comprises two transmitters 215, 216 and a single receiver 217.

The first content checker machine 210 is operative to receive data at either of its two receivers, to check the data and to transmit only appropriate data of the received data via its transmitter.

The second content checker machine 211 is operative to receive data at its receiver, to check the data and to separate management data from other data and then to transmit only appropriate management data via one transmitter and only appropriate other data via the other transmitter.

Each transmitter of a network interface machine is connected via a suitable conduit 219, such as an electrical cable or optical fibre, to a respective the receiver of a content checker machine thereby forming a unidirectional communications link between connected network interface and content checker machines allowing only transmission of data from each network interface machine to a content checker machine. Each receiver of a network interface machine is connected via a suitable conduit 220 to the transmitter of the other content checker machine to that which the transmitter of the network interface machine is connected, allowing only the transmission of data from that content checker machine to the connected network interface machine. Specifically, the transmitters of the first and third network interface machines are connected to the receivers of the first content checker machine and the transmitter of the second network interface machine is connected to the receiver of the second content checker machine. Likewise the receivers of the first and third network interface machines are connected to the transmitters of the second content checker machine and the receiver of the second network interface machine is connected to the transmitter receiver of the first content checker machine.

The apparatus allows data to be passed between the three network interface machines, thereby allowing bidirectional communication between respective computer networks connected to the three network interface machines. Data passing between the network interface machines must always pass via a content checker which allows only appropriate data to pass and so serves to protect the networks from inappropriate data transfer, such as, for example, transmission of unwanted data such as a computer virus from the external network to the protected network and transmission of sensitive data from a protected network to an external network. The data communication links between the network interface machines and content checker machines are all unidirectional, with each network interface machine transmitting data to one content checker machine and receiving data from another. These unidirectional links serve to protect the content checker machines, and those machines to which they pass data, from external attack that might target vulnerabilities in the receiver such as buffer overflows.

In use, when data, is to be transferred from an external network to a protected network it is received by the first network interface machine 201 which then transmits it, together with appropriate flow control data, to the second network interface machine 202, via the first content checker 210. The second network interface machine 202 sends relevant flow control data back in response to the first network interface machine 201 via the second content checker 211. Thus transmission of data received from the external network over the unidirectional path between the first and third network control machines is coordinated between the first and third network interface machines, overcoming the transmission problems with existing data diodes and without having to involve applications running on the networks in coordinating data transmission. Likewise, data can be transmitted from a protected network to the external network via the second content checker 211, with control data additionally passing from the first network interface machine 201 to the second network interface machine 202 via the first content checker machine 210.

The first and second network interface machines 201, 202 and content checker machines 210, 211 can also each transmit data to, and receive data from, the third network interface machine 203, and thereby exchange data with a management network. Data to be transmitted to the third network interface machine 203 must be transmitted to that machine by the second content checker machine 211. Data from the first network interface 201 and first content checker machine 210 must pass to the second network interface machine 202 for transmission to the second content checker machine 211. Data to be received from the third network interface machine 203 is transmitted to the first content checker machine 210 from which it can, where desired, be passed on to the second network interface machine 202, from there to the second content checker machine 211 and from there to the first network interface machine 201.

Data sent to and received from a management network via the third network interface machine 203 may comprise information about the health of the source machine or details of the data it is handling. In addition, the first and second network interface machines 201, 202 can exchange data with the third network interface machine 203 relating to the flow of data between the network interface machines.

As all data sent to and received from a management network must pass though a content checker, a management network does not provide an unsafe connection between external and protected networks. Importantly, the third network interface machine 203 is connected to receive data directly from the second content checker 211 so that data received from a protected network by the second network interface machine can be transmitted to the third network management machine 203, and thence to a management network, without having to pass through the first network interface machine, which could be compromised owing to the connection to the external network.

The arrangement allows each machine to communicate with the other machines in order to effect bidirectional communication between an external network and a protected network, to provide logging information to, and to receive configuration commands from, a management network interface machine. The machines can also exchange messages relating to the flow control of their communication.

Thus the arrangement provides bidirectional communication between an external network and a protected network with the security advantages of using unidirectional links while being able to manage the inherent unreliability of unidirectional links and being able to operate and administer the equipment from a single point.

Figure 3:
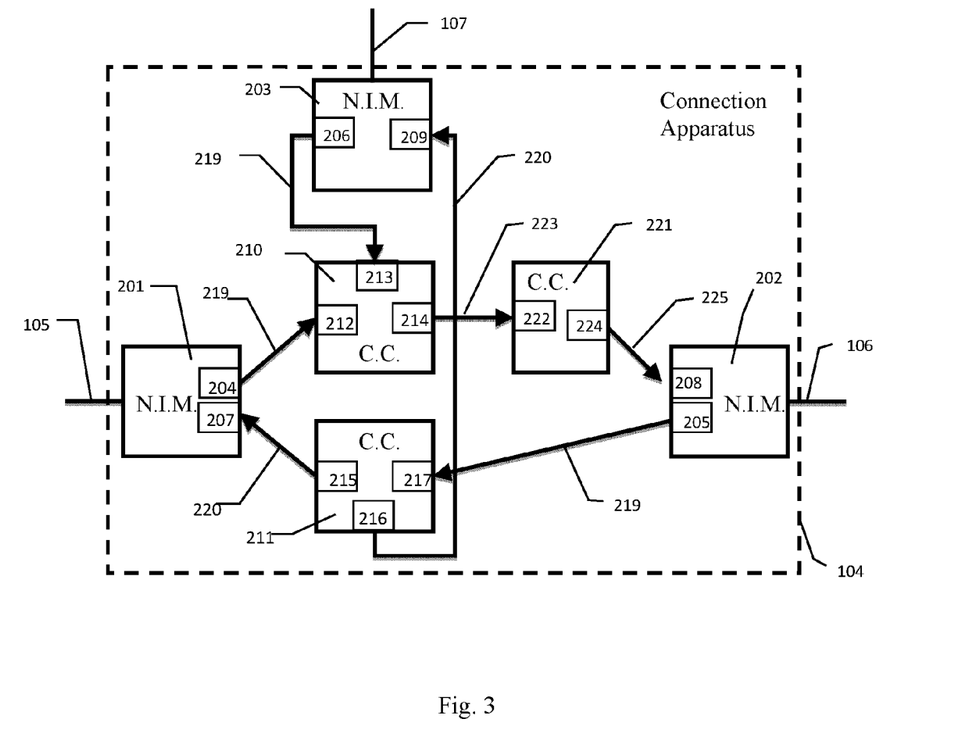
FIG. 3 shows a second embodiment of connection apparatus.

A variation on the arrangement shown in FIG. 2 is shown in FIG. 3, in which like numerals are used to identify like components. The arrangement illustrated in FIG. 3 differs to that of FIG. 2 by the addition of a third content checker machine 221 connected in series between the first content checker machine 210 and the second network interface machine 202. The third content checker machine 221 has a receiver 222 connected by a conduit 223 to the transmitter of the first content checker machine 210, and a transmitter 224 connected by a conduit 225 to the receiver 208 of the second network interface machine 202 so that unidirectional communication paths are established from the first content checker machine 210 to the third content checker machine 221 and from the third content checker machine to the second network interface machine 202.

Provision of the additional content checker machine in the path of data to the second network interface machine provides the protected network to which that machine is connected with an additional level of protection against receiving inappropriate data or external attack. Ideally, the first and third content checker machines are made to different designs, so as to avoid common modes of failure. The probability that both content checker means will allow inappropriate data to pass or be disabled by an attacker is greatly reduced as compared to a single machine.

In any embodiment a single content checker machine could be replaced by two or more content checker machines connected in series by a unidirectional data connection.

Figure 4:
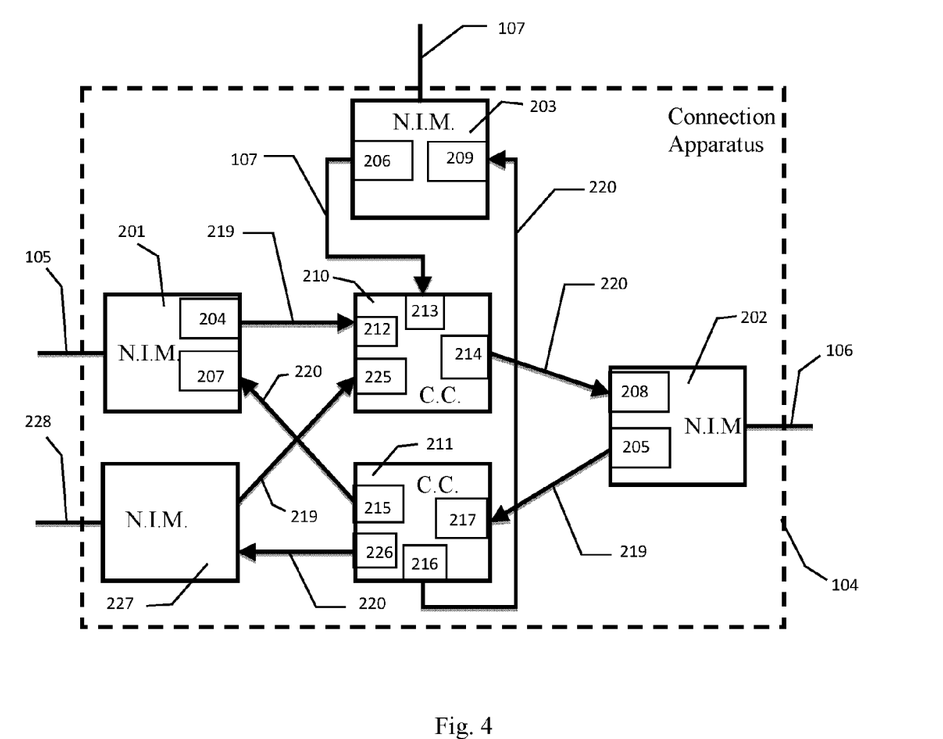
FIG. 4 shows a third embodiment of connection apparatus.

FIG. 4 shows another variation on the arrangement shown in FIG. 2, again with like reference numerals being used to identify like components. The arrangement of FIG. 2 has been altered to enable two external networks to communicate with a protected network, and management network by providing the first content checker machine 210 with a third receiver 225, and the second content machine 211 with a third transmitter 226, enabling a fourth network interface machine 227, connected by a bidirectional link 228 to a second external network, to be connected to the first content checker 210 in the same fashion as, and in parallel to, the first network interface machine 201. Thus the fourth network interface machine 227 may communicate with the second and third interface machines 202, 203 in exactly the same way as the first network interface machine 201. Data can be transmitted between the two external networks by passing it via the second network interface machine, which, as it is connected to a protected network, can be trusted not to disclose or modify data inappropriately. In contrast, owing to the parallel connection, data may be transmitted between either of the external networks and the protected network without passing via a network connection machine which is connected to another external network. In this arrangement the second content checker machine 211 is arranged to selectively route information received for onward transmission to only either one of, or both of, the first and fourth network connection machines 201, 227.

Figure 5:
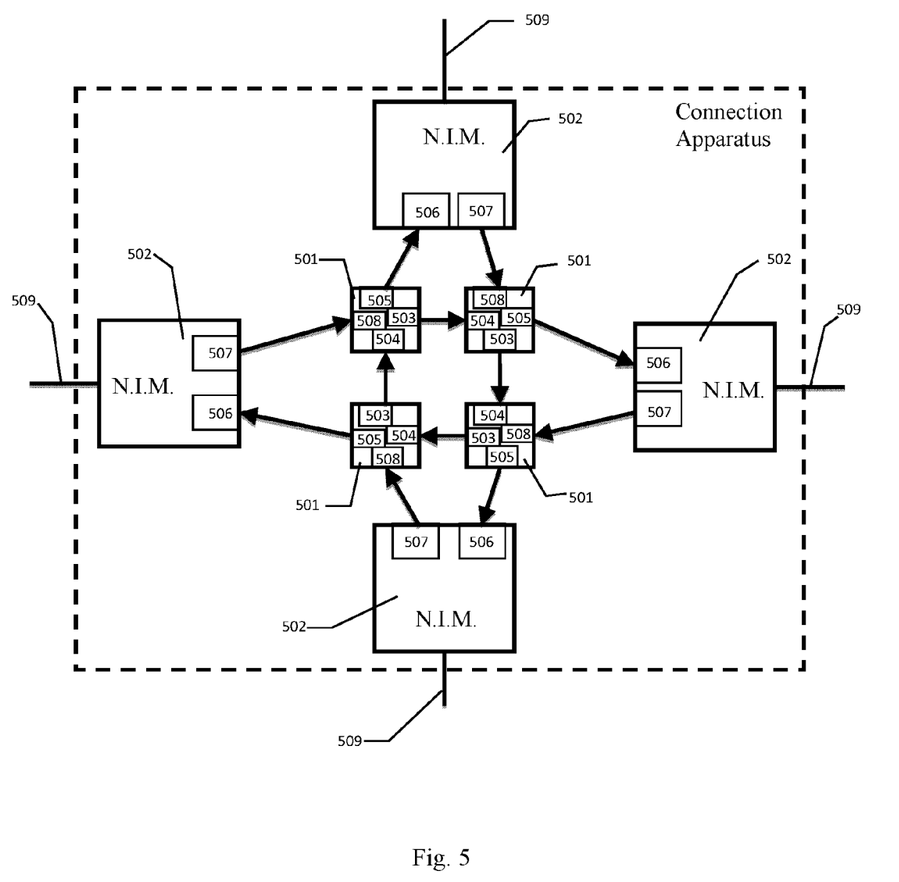
FIG. 5 shows a fourth embodiment of connection apparatus.

FIG. 5 shows a further embodiment of network connection apparatus suitable for connecting mutually suspicious networks. In this arrangement, the same number of content checkers 501 is employed as network interface machines 502. Each content checker has two receivers 504, 508 and two transmitters 503, 505. One transmitter 503 of each content checker is connected by a conduit to the receiver 504 of another content checker to form a ring around which data can pass in only one direction. The other transmitter 505 of each content checker is connected by a conduit to the receiver 506 of a network interface machine 502, and a transmitter 507 of that network interface machine is connected by a conduit to the receiver 508 of the next content checker in the ring, in the direction of data flow. Each network interface machine is connected to a network via a conventional bidirectional data link 509. In the illustrated example there are four network interface machines and four content checkers. One network interface machine may be connected to a management network and the others to mutually suspicious networks. A minimum of three network interface machines and content checkers can be connected in this way, and the arrangement can be scaled to include any greater number.

In this arrangement, in addition to all data passing between network interface machines passing via at least one content checker machine, data may pass from any one network interface machine to any other one network interface machine without passing via any other network interface machine.

Each content checker machine in this embodiment can selectively transmit data received to either or both of a network interface machine, and the next content checker in the ring.

So, for example, data received from a network connected to the first network interface machine for transmission to the network connected to the third network interface machine will transmitted to the first, second and third content checkers in turn and from the third content checker to the third network interface machine. Flow control data may then be transmitted to from the third network interface machine via to the fourth content checker, and then back to the first network interface machine.

The above embodiments are described by way of example only. Many variations are possible without departing from the scope of the invention as defined in the appended claims.

The invention claimed is:

1. An apparatus for connecting three or more computer networks, the apparatus comprising:
three or more network interface machines each network interface machine including a transmitter device and a receiver device and arranged to be connected to a respective computer network with a respective bidirectional communications link, wherein each of the network interface machines is configured to receive data from and transmit data to the respective computer network over the respective bidirectional communications link, and at least two content checkers, each content checker including a transmitter device and a receiver device wherein:
the network interface machines are connected together with the at least two content checkers, to enable data to be transmitted from a network interface machine to another network interface machine, each of the network interface machines is connected to an associated first content checker by a first respective unidirectional communications link comprising a conduit between the transmitter device of the network interface machine and the receiver device of the associated first content checker, the first respective unidirectional communications link configured to transmit data from the network interface machine to the associated first content checker, but not configured to receive data sent from the associated first content checker;
each of the network interface machine is connected to an associated second content checker by a second respective unidirectional communications link comprising a conduit between the receiver device of the network interface machine and the transmitter device of the associated second content checker the second respective unidirectional communications link configured to transmit data from the associated second content checker to the network interface machine, but not configured to receive data sent from the network interface machine;
wherein data transmitted from a first transmitting network interface machine to any other network interface machine is only transmitted from the first transmitting network interface machine via its first respective unidirectional communications link to its associated first content checker and data transmitted to a first receiving network interface machine from any other network interface machine is only transmitted to the first receiving network interface machine from its associated second content checker via its second respective unidirectional communications link; and
each of the network interface machines is arranged to transmit flow control data to any other of the network interface machines through at least one of the content checkers to thereby regulate transmission of data between the three or more network interface machines.

2. The apparatus as claimed in claim 1, wherein the network interface machines are arranged to communicate with a computer network using a bidirectional protocol stack.

3. The apparatus as claimed in claim 1, wherein a first content checker includes two or more receiver devices and wherein two or more network interface machines are connected to the first content checker by respective unidirectional links which enable data to be transmitted from the two or more network interface machines to the first content checker.

4. The apparatus as claimed in claim 1, wherein a first content checker includes two or more transmitter devices and is connected to two or more network interface machines by respective unidirectional communications links which enable data to be transmitted from the first content checker to a selected one or more of the two or more connected network interface machines.

5. The apparatus as claimed in claim 1, having three or more network interface machines and the same three or more or a greater number of content checkers, the content checkers being connected to each other by way of unidirectional communications links in a ring formation and each network interface machine being connected to one content checker with a unidirectional communications link enabling said network interface machine to transmit data to the one content checker, and each network interface being connected to another content checker with a unidirectional communications link enabling said network interface machine to receive data from the another content checker.

6. The apparatus as claimed in claim 5, wherein each content checker is connected by respective oppositely configured unidirectional communications links to no more than two network interface machines.

7. The apparatus as claimed in claim 1, wherein two or more differently configured content checkers are connected in series by two or more unidirectional communications links such that data received by the first content checker in the series must pass via each other content checker connected in the series before onward transmission to another component.

8. The apparatus as claimed in claim 1, comprising at least three network interface machines, one of which is designated as a management network interface machine and is configured to pass control and management information between a network to which it is connected via a bidirectional communications link and all of the other network interface machines of the apparatus.

9. The apparatus as claimed in claim 1, arranged such that at least one network interface machine can transmit data to any other network interface machine without that data passing through any third network interface machine.

10. A plurality of computer networks connected together by the apparatus as claimed in claim 1, each network being connected to a respective network interface machine by a bidirectional communications link.

11. A method of providing bidirectional communication between at least two of three or more computer networks, the method comprising the steps of:
providing an apparatus for connecting three or more computer networks, the apparatus comprising:
three or more network interface machines each network interface machine including a transmitter device and a receiver device and connected to a respective computer network with a respective bidirectional communications link, wherein each of the network interface machines is configured to receive data from and transmit data to the respective computer network over the respective bidirectional communications link, and
at least two content checkers, each content checker including a transmitter device and a receiver device, wherein:
the network interface machines are connected together with the at least two content checkers to enable data to be transmitted from a network interface machine to another network interface machine;
each of the network interface machines is connected to an associated first content checker by a first respective unidirectional communications link comprising a conduit between the transmitter device of the network interface machine and the receiver device of the associated first content checker, the first respective unidirectional communications link configured to transmit data from the network interface machine to the associated first content checker, but not configured to receive data sent from the associated first content checker;

each of the network interface machines is connected to an associated second content checker by a second respective unidirectional communications link comprising a conduit between the receiver device of the network interface machine and the transmitter device of the associated second content checker, the second respective unidirectional communications link configured to transmit data from the associated second content checker to the network interface machine, but not configured to receive data sent from the network interface machine;

wherein data transmitted from a first transmitting network interface machine to any other network interface machine is only transmitted from the first transmitting network interface machine via its first respective unidirectional communications link to its associated first content checker and data transmitted to a first receiving network interface machine from any other network interface machine is only transmitted to the first receiving network interface machine from its associated second content checker via its second respective unidirectional communications link;

receiving data from a first network of the at least two of three or more computer networks at the first transmitting network interface machine of the network interface machines;

wherein each of the three or more networks is connected to a respective network interface machine with a bidirectional communications link;

passing the received data to a second network interface machine via at least the associated first content checker of the first transmitting network interface machine;

delivering data received by the second network interface machine to a second network of the at least two of three or more computer networks to which it is connected via its respective bidirectional communications link; and passing flow control data from at least the second network interface machine to the first transmitting network interface machine via at least the associated second content checker of the first transmitting network interface machine to regulate the data transmitted between the first transmitting network interface machine and the second network interface machine.

12. The method as claimed in claim 11, wherein the data received and/or delivered via a bidirectional communications link is received and/or transmitted using a bidirectional protocol stack.

13. The method as claimed in claim 11, wherein the data passed between network interface machines is passed via at least one unidirectional communications link.

14. The method as claimed in claim 13, wherein data passed between network interface machines is passed via a first unidirectional communications link to a content checker and via a second unidirectional communications link from the content checker to a receiving network connection machine.

15. The method as claimed in claim 11, wherein the or each content checker only passes data only if the data will not damage the integrity of or availability of services offered by its recipient.

16. The method as claimed in claim 11, wherein the at least one first content checker will pass data only if the data will not breach the confidentiality of or affect the integrity of data stored by the first network of the at least two of three or more computer networks.

* * * * *